United States Patent
Morishita et al.

(10) Patent No.: US 6,311,672 B1
(45) Date of Patent: Nov. 6, 2001

(54) DEVICE FOR CONTROLLING THE KNOCKING OF AN INTERNAL COMBUSTION ENGINE

(75) Inventors: Tsutomu Morishita; Yasuhiro Takahashi; Koichi Okamura; Mitsuru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,252

(22) Filed: Feb. 1, 2000

(30) Foreign Application Priority Data

Oct. 6, 1999 (JP) .................................................. 11-285493

(51) Int. Cl.$^7$ .............................. F02P 1/152; G01L 23/22
(52) U.S. Cl. ..................................... 123/406.36; 73/35.08; 123/406.39
(58) Field of Search ........................ 123/406.36, 406.37, 123/406.38, 406.39; 73/35.08; 701/111

(56) References Cited

U.S. PATENT DOCUMENTS

| | | | |
|---|---|---|---|
| 4,513,716 | * 4/1985 | Haraguchi et al. | 123/406.36 |
| 5,694,900 | 12/1997 | Morita et al. | 123/406.21 |

* cited by examiner

Primary Examiner—Terry M. Argenbright
(74) Attorney, Agent, or Firm—Sughrue, Mion, Zinn, Macpeak & Seas, PLLC (57) ABSTRACT

A device for controlling knocking of an internal combustion engine featuring improved reliability by preventing signals of the knocking level from being erroneously detected as those of the noise level. The device detects an ionic current flowing through a spark plug, counts a signal of the knocking level from the ionic current, establishes an average knocking level from the signals of the knocking level and determines a background level from the average knocking level. A comparator judges the knocking state by comparing the signal of the knocking level with the background level. The device calculates the control quantity of the engine based on the operation conditions and the result of judgement of knocking. The device further judges a transient state and decreases the average knocking level depending upon a transience judgment signal in order to maintain a background level in a transient state at an optimum value.

7 Claims, 7 Drawing Sheets

DEVICE FOR CONTROLLING THE KNOCKING OF AN INTERNAL COMBUSTION ENGINE

BACKGROUND OF THE INVENTION

1. Field of the Invention

The present invention relates to a device for correcting the control quantity of an internal combustion engine at the time when the knocking is detected, by detecting the knocking of the internal combustion engine based on an ionic current that flows through a spark plug during the combustion in the internal combustion engine. More specifically, the invention relates to a device for controlling the knocking of an internal combustion engine by preventing erroneous judgement and erroneous control caused by a sharp increase in the background level during the transient operation in which the knocking occurs much.

2. Prior Art

In a device for controlling the knocking of an internal combustion engine, so far, it is accepted practice to judge the occurrence of knocking during the operation and, when the occurrence of knocking is detected, the control quantity for the internal combustion engine is corrected toward the side of suppressing the knocking (e.g., toward the side of delaying the ignition timing) depending upon the amount of knocking in order to prevent damage to the internal combustion engine.

In order to detect the knocking of the internal combustion engine, there has also been proposed a device that utilizes a change in the amount of ions produced during the combustion of the internal combustion engine.

The device for controlling the knocking of the internal combustion engine based on the ionic current is capable of detecting the intensity of knocking in each of the cylinders without using knock sensor, and is effective in decreasing the cost.

In the device of this type, a reference level for judging the noise (background level) is set for an ionic current detection signal in order to prevent erroneous detection of the knocking caused by noise superposed on the ionic current.

In a device disclosed in, for example, Japanese Patent Laid-Open No. 10-9108, a background level (reference for judging the noise level) operated from the sum of an average value of the detection signal intensities and an insensitive region (offset value) based on the operation condition, has been set for a signal that is obtained by shaping the waveform of a knock current detection signal.

Figure 5:
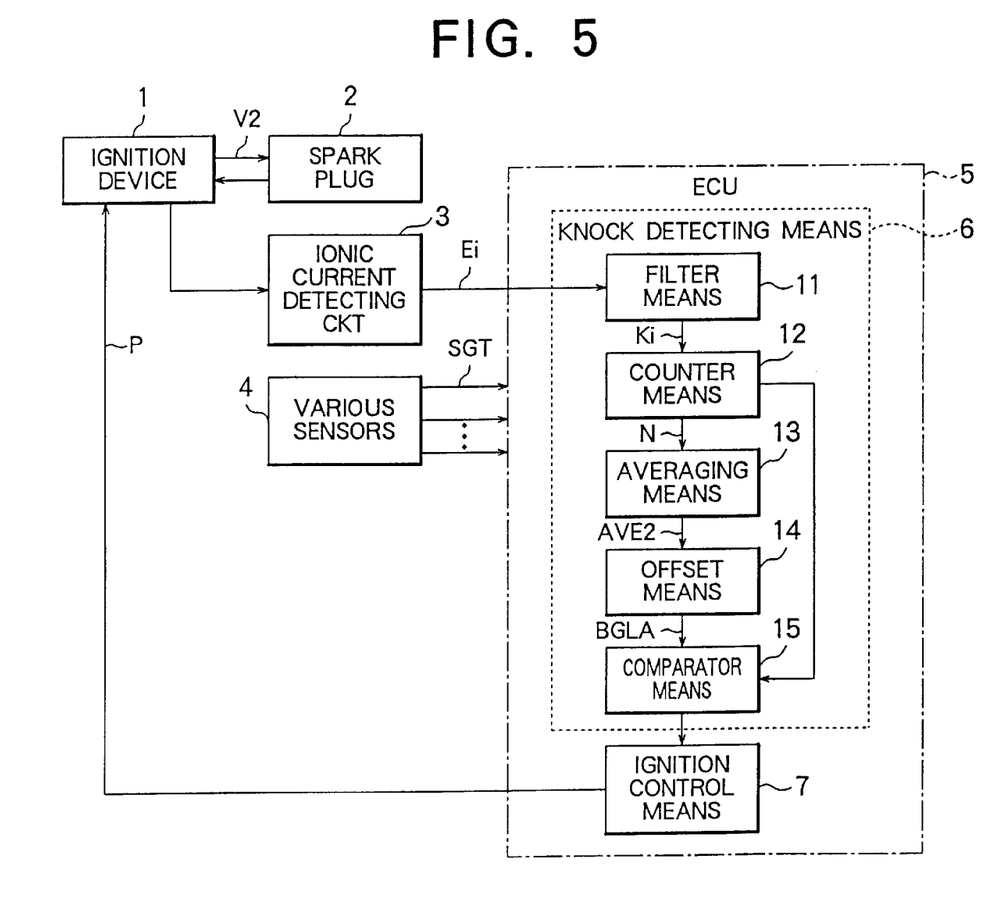
FIG. 5 is a block diagram illustrating a conventional device for controlling the knocking of an internal combustion engine.
Figure 6:
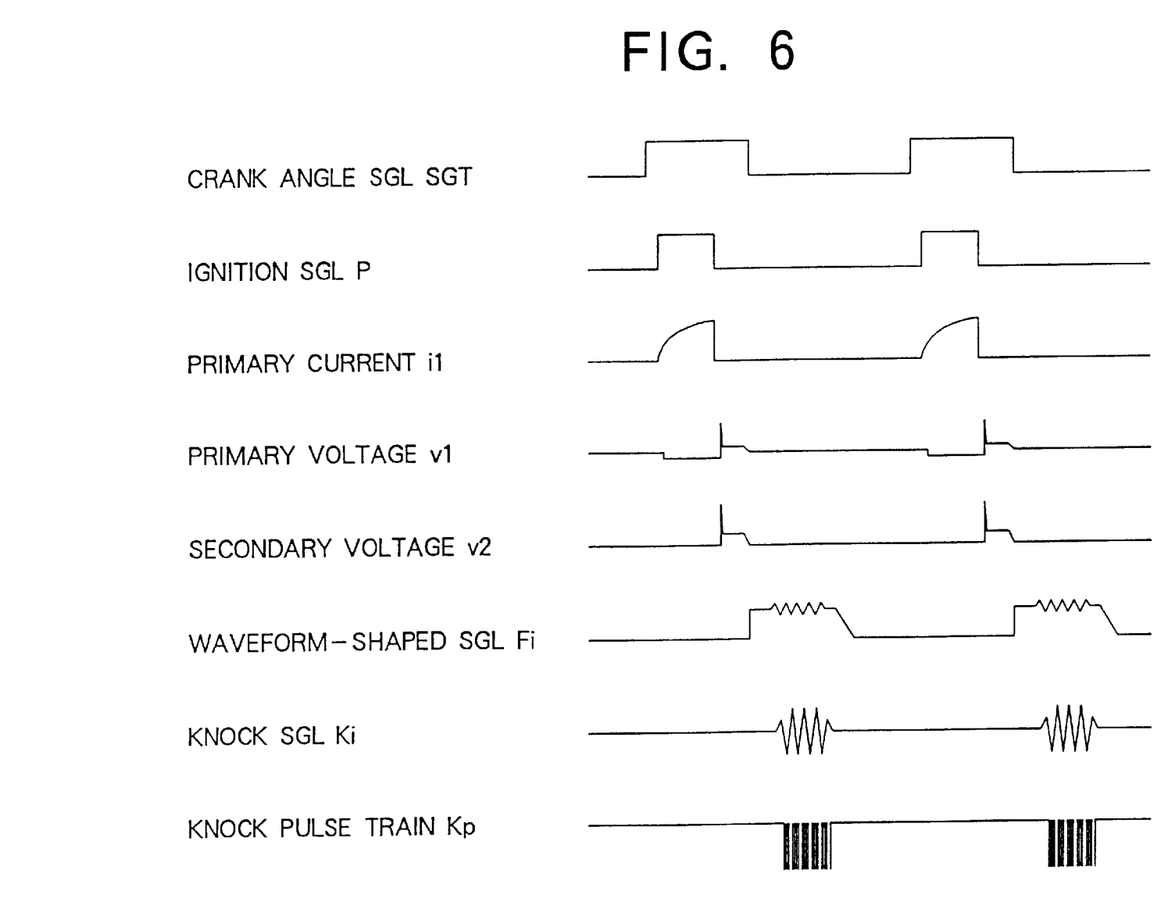
FIG. 6 is a diagram of waveforms illustrating the operation of the conventional device for controlling the knocking of an internal combustion engine.

FIG. 5 is a block diagram schematically illustrating a conventional device for controlling the knocking of an internal combustion engine. FIG. 6 is a timing chart illustrating the operation waveforms of signals in FIG. 5 and shows a case where a knock signal Ki is superposed on a waveform-shaped signal Fi of an ionic current detection signal Ei.

In FIG. 5, the ignition device 1 of the internal combustion engine includes an ignition coil having a primary winding and a secondary winding, and a power transistor (both of which are not shown) for interrupting the flow of the primary current il (see FIG. 6) into the ignition coil.

The power transistor in the ignition device 1 turns on and off (flows and interrupts) the primary current il to the ignition coil in response to an ignition signal P from an ECU 5, and the ignition coil generates a high ignition voltage V2 (see FIG. 6) through the secondary winding in response to the turn on and off of the power transistor.

Being impressed with a high spark voltage V2 from the ignition device 1, the spark plug 2 generates a spark to ignite the mixture at a predetermined timing in each of the cylinders of the engine.

That is, the spark plug 2 of a cylinder that is to be controlled is impressed with a high spark voltage in response to an ignition timing.

In order to detect the ionic current that flows across a gap of the spark plug 2 at the time of combustion, the ionic current detecting circuit 3 includes a bias means (capacitor) for applying a bias voltage to the spark plug 2 through the ignition coil in the ignition device 1, and a resistor (both of which are not shown) for producing an ionic current detection signal Ei.

Various sensors 4 include a known throttle opening sensor, a crank angle sensor, a temperature sensor and the like sensors, and produce various sensor signals that represent the operation conditions of the internal combustion engine. For example, the crank angle sensor which is one of the various sensors 4 produces a crank angle signal SGT (see FIG. 6) depending on the rotational speed of the engine.

Various sensor signals inclusive of the ionic current detection signal Ei and the crank angle signal SGT, are input to the ECU 5 that comprises a microcomputer.

The crank angle signal SGT has a pulse edge representing a reference crank angular position in each cylinder, and is used by the ECU 5 for executing various control operations.

The ECU 5 includes a knock detecting means 6 for detecting the knocking based on the ionic current detection signal Ei, and an ignition control means 7 that delays the spark signal P based on the result of detecting the knocking by the knock detecting means 6.

In order to form an ignition signal P based on the operation conditions from various sensors 4 and the result of judging the knocking by the comparator means 15, the ignition control means 7 includes an ignition timing calculating means for determining the ignition timing of the engine based on the operation conditions, and an ignition timing correction means that calculates the delay quantity corresponding to the detected amount of knocking of when it is judged that the knocking has occurred and reflects the delay amount on the ignition timing.

Not being limited to the ignition control means 7, the control quantity means for establishing the control quantity of the engine may be a fuel injection control means (not shown) that controls the amount of fuel injection and the injection timing. Further, the control quantity correction means for suppressing the knocking can work to delay the fuel injection timing.

The knock detecting means 6 in the ECU 5 includes a filter means 11 comprising a band-pass filter, a counter means 12, an averaging means 13, an offset means 14, and a comparator means 15.

The filter means 11 includes a waveform-shaping means, and picks up a knock signal Ki in a predetermined frequency band from the waveform-shaped signal Fi (see FIG. 6) of the ionic current detection signal Ei.

The counter means 12 includes a waveform-processing means, and counts the number N of the pulses of the knock signals Ki after their shapes have been processed.

The counter means 12 constitutes a knocking level operation means, and counts the number N of the pulses (signals of the knocking level) corresponding to the knocking state of the engine.

The number N of the pulses (signals of the knocking level) represents the amount of knocking occurring.

The averaging means 13 averages the number N of the pulses to operate an average knocking level AVE.

The offset means 14 offsets the average knocking level AVE and forms a background level BGL (reference for judging the noise level).

The offset means 14 includes an offset operation means for determining an offset value OFS for the average knocking level AVE depending on the operation conditions of the engine, and a background level operation means for determining the background level BGL by adding up the average knocking level AVE and the offset value OFS together.

The comparator means 15 constitutes a knock-judging means, and compares the number N of the pulses (signals of the knocking level) with the background level BGL to judge the knocking state of the engine. When the number N of the pulses exceeds the background level BGL, the comparator means 15 produces the result of comparison representing the occurrence of knocking.

Figure 7:
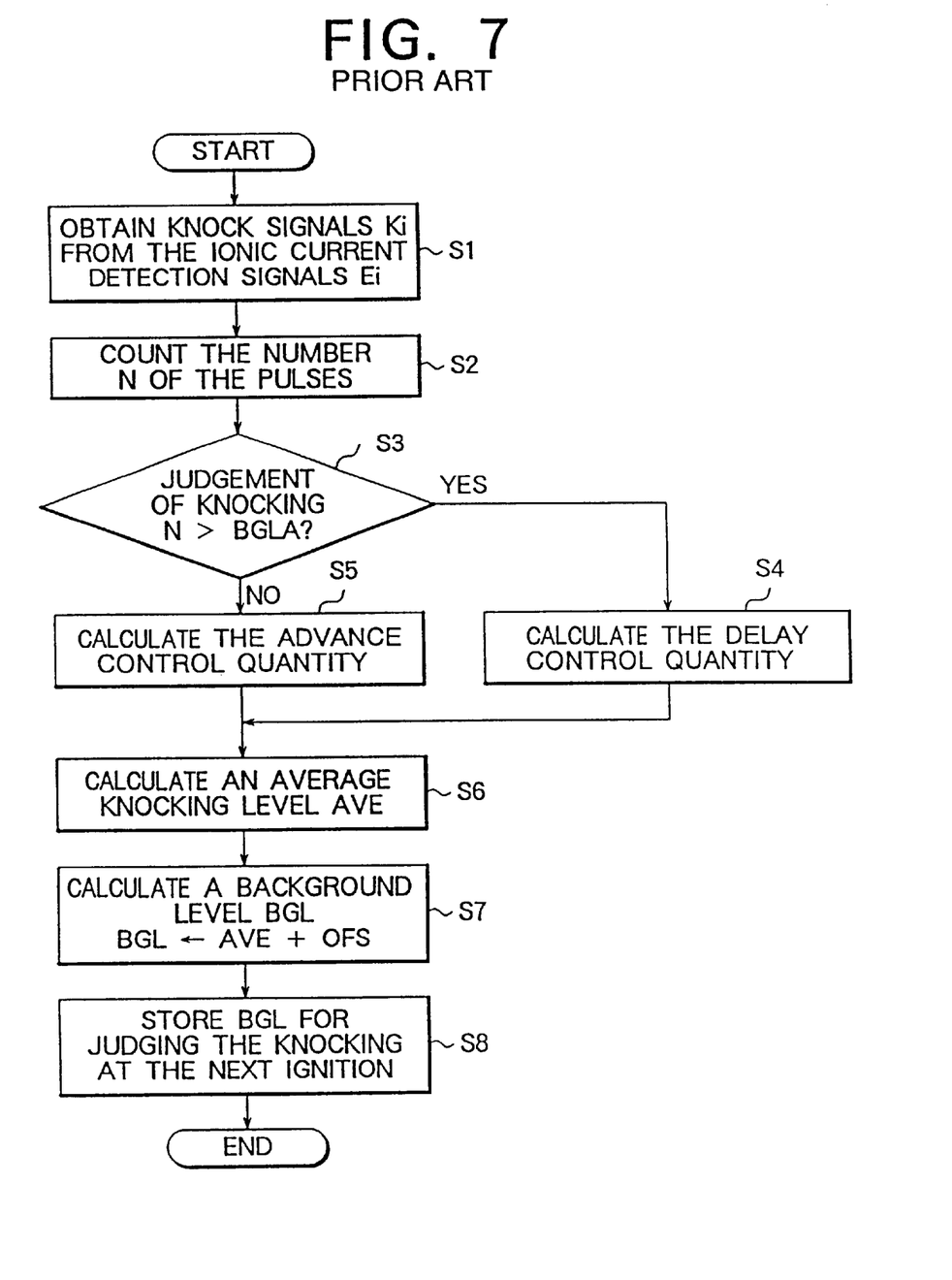
FIG. 7 is a flow chart for operating the background level according to the conventional device for controlling the knocking of an internal combustion engine.

Next, described below with reference to FIGS. 5 and 6 as well as a flow chart of FIG. 7 is the operation of the conventional device for controlling the knocking of the internal combustion engine.

First, the ECU 5 receives a crank angle signal SGT and the like signals from various sensors 4, executes various operations depending upon the operation conditions, and produces drive signals to various actuators such as the ignition device 1 and the like.

For example, the ECU 5 turns the power transistor in the ignition device 1 on and off in response to the ignition signal P to flow and interrupt the primary current il.

In this case, the bias power source (capacitor) in the ionic current detecting circuit 3 is electrically charged with the primary voltage V1 that generates in the ignition coil when the primary current il flows therein.

Further, the primary voltage Vl rises when the primary current il is interrupted (corresponds to an ignition timing of the engine), and a further elevated secondary voltage V2 (several tens of kV) is generated from the secondary winding of the ignition coil. The secondary voltage V2 is applied to the spark plug 2 of a cylinder in which the ignition is controlled to burn a mixture in the combustion chamber.

As the mixture burns, ions generate in the combustion chamber of the combustion cylinder, and a bias voltage electrically charged in the capacitor in the ionic current detecting circuit 3 is discharged through the spark plug 2 immediately after the ignition control.

The resistor in the ionic current detecting circuit 3 converts the ionic current into a voltage to produce it as an ionic current detection signal Ei.

Thus, the ionic current that flows through the spark plug 2 after the combustion is input as the ionic current detection signal Ei to the knock detecting means 6 in the ECU 5.

When the engine knocks, the knocking vibration components are superposed on the ionic current, and the waveform-shaped signal Fi of the ionic current detection signal Ei acquires a waveform on which the knocking vibration components are superposed as shown in FIG. 6.

Referring to FIG. 7 illustrating the operation for processing the ionic current detection signal Ei, the filter-means 11 of the knock detecting means 6 in the ECU 5 picks up the knock signals Ki only from the waveform-shaped signals Fi of the ionic current detection signals Ei (step S1).

The counter means 12 shapes the waveforms of the knock signals Ki to convert them into a knock pulse train Kp, and counts the number N of the pulses in the knock pulse train Kp (step S2).

The number N of the pulses is strongly related to the intensity of knocking and is used for judging the knocking as will be described later and is, further, used for updating the background level BGL in the next time.

That is, the comparator means 15 in the knock detecting means 6 compares the number N of the pulses with the background level BGL in the previous time, and judges whether the number N of the pulses is larger than the background level BGL (step S3).

The number N of the pulses increases with an increase in the intensity of knocking and, hence, the comparator means 15 judges the occurrence of knocking and the intensity of knocking based on the number N of the pulses.

When it is judged at step S3 that N>BGL (i.e., YES), the ignition control means 7 operates a delay control quantity for delaying the ignition timing (for suppressing the knocking)(step S4). When it is judged at step S3 that N≦BGL (i.e., NO), the ignition control means 7 operates an advance control quantity (step S5).

Here, the ignition control means 7, at step S4, makes a reference to the delay correction quantity in the ignition control of the previous time and of this time, and, at step S5, makes a reference to the delay correction quantity in the ignition control of the previous time, thereby to operate the control quantities.

When the state N>BGL (knock is occurring) is consecutively judged at step S3, the delay quantities are successively added up, and are no longer added up at a moment when it is judged that no knocking is occurring.

The background level BGL (predetermined number of pulses) that serves as a reference for judging the knocking varies depending on the rotational speed of the engine and the level for shaping the waveforms of the detection signals Ei, but is set to a value of, for example, about 5 to about 20.

When the knocking is detected by the comparator means 15 based on the number N of the pulses, the control quantity is corrected toward the side of suppressing the knocking (i.e., the ignition is optimized for the cylinder in which the knocking is occurring) in order to effectively suppress the knocking.

On the other hand, the averaging means 13 in the knock detecting means 6 averages (filters) the number N of the pulses, and operates an average knocking level AVE by using the following formulas (1) and (2)(step S6).

$$AVE=AVE(n-1)\times KF+NP\times(1-KF) \quad (1)$$

$$NP=\max\{N-BGL(n-1),0\} \quad (2)$$

In the formula (1), AVE(n−1) is an average knocking level AVE of the previous time, and KF is an averaging coefficient (0<KF<1) and in the formula (2), BGL(n−1) is a background level BGL of the previous time.

The offset means 14 adds an offset value OFS to the average knocking level AVE to operate the background level BGL according to the following formula (3)(step S7), $$BGL=AVE+OFS \quad (3)$$

Finally, the ECU 5 stores the background level BGL operated according to the formula (3) in the offset means 14 as a reference for comparison for judging the knocking of when the ignition is controlled in the next time (step S8), and the processing routine of FIG. 7 ends.

Figure 8:
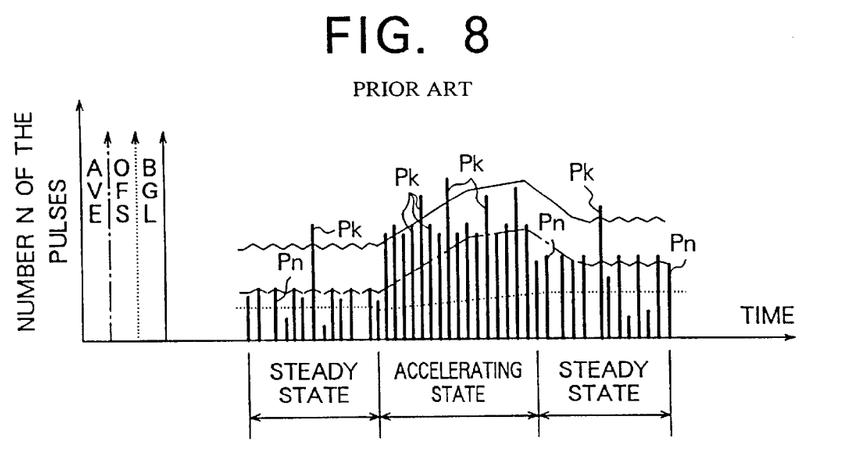
FIG. 8 is a diagram illustrating the operation for detecting the knocking in the accelerating state using the conventional device for controlling the knocking of an internal combustion engine.
Figure 9:
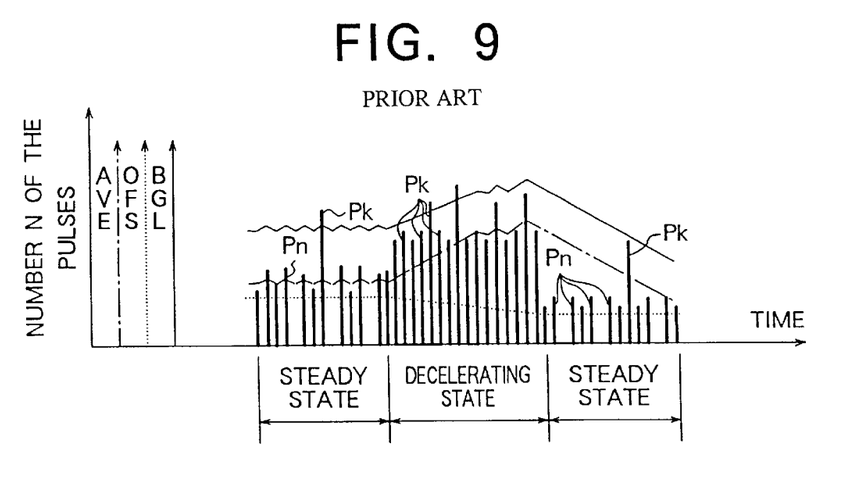
FIG. 9 is a diagram illustrating the operation for detecting the knocking in the decelerating state using the conventional device for controlling the knocking of an internal combustion engine.

Next, described below with reference to FIGS. 8 and 9 is the operation for detecting the knocking of when the average knocking level AVE has increased during the transient operation condition (accelerating or decelerating state).

In FIGS. 8 and 9, the abscissa represents the time and the ordinate (level in the form of a bar graph) represents the number N of the pulses, and there are shown the number Pn of the pulses corresponding to the noise level and the number Pk of the pulses corresponding to the knocking level.

In these drawings, further, the solid curves represent changes in the average knocking level AVE with the passage of time, dotted curves represent changes in the offset value OFS with the passage of time, and dot-dash chain curves represent changes in the background level BGL (=AVE+OFS) with the passage of time.

FIG. 8 illustrates changes with the passage of time of when the engine is shifted from a steady state into an accelerating state and is returned again to a steady state, wherein the offset value OFS (dotted line) increases with an increase in the rotational speed of the engine.

FIG. 9 illustrates changes with the passage of time of when the engine is shifted from a steady state into a decelerating state and is returned again to a steady state, wherein the offset value OFS (dotted line) decreases with a decrease in the rotational speed of the engine.

In FIG. 8, the background level BGL (level for judging the knocking) based on the number N of the pulses (signals of the knock level) in a steady state is changing relatively stably and properly.

When the pulses are detected in a number Pk corresponding to the knocking level, therefore, the knocking is properly judged relying on N>BGL. Further, when the pulses are detected in a number Pn corresponding to the noise level, the noise is properly judged relying on N≦BGL.

When the engine is shifted to the accelerating state as shown in FIG. 8, however, the knocking occurs frequently and, hence, the average knocking level AVE sharply rises and the background level BGL sharply rises, too, accompanying the average knocking level VE.

In the accelerating state, therefore, the background level BGL does not properly change, whereby the number Pk of the pulses of the knocking level becomes smaller than that of the background level BGL, and most of the pulses among those of the number Pk of the knocking level are erroneously judged as those of the noise level.

Similarly, even when the engine is shifted from the steady state to the decelerating state as shown in FIG. 9, the knocking occurs frequently. Therefore, the average knocking level AVE sharply rises and the background level BGL sharply rises, too.

Even in the decelerating state, therefore, the background level BGL does not properly change, and most of the pulses among those of the number Pk of the knocking level are erroneously judged as those of the noise level.

Even right after the engine is shifted from the decelerating state to the steady state, the average knocking level AVE that has increased during the deceleration does not decrease to a sufficient degree. Therefore, the number N of the pulses of the knocking level fails to exceed the background level BGL, and the pulses are often erroneously judged to be those of the noise level.

As described above, the conventional device for controlling the knocking of internal combustion engines has not been equipped with means for suppressing a quick increase in the average knocking level AVE caused by the frequent occurrence of knocking in the transient operation state. Therefore, the background level BGL sharply increases in the transient state making it difficult to correctly judge the knocking level, resulting in a decrease in the performance for controlling the knocking.

SUMMARY OF THE INVENTION

The present invention was accomplished in order to solve the above-mentioned problems, and its object is to provide a device for controlling the knocking of an internal combustion engine, which maintains the background level at an optimum value even during the transient state and, hence, prevents the signals of the knocking level from being erroneously detected as those of the noise level, enhancing the reliability.

A device for controlling the knocking of an internal combustion engine according to the present invention comprises:

various sensors for detecting the operation conditions of an internal combustion engine;

an ionic current detecting means for detecting the ionic current that flows through a spark plug during the combustion in said internal combustion engine;

a knocking level operation means for processing the signals of the knocking level corresponding to the knocking state of said internal combustion engine based on said ionic current;

an averaging means for determining an average knocking level by averaging said signals of the knocking level;

a background level operation means for establishing a background level based on said average knocking level;

a knock judging means for judging the knocking state of said internal combustion engine by comparing said signals of the knocking level with said background level; and a control quantity calculation means for calculating the control quantity of said internal combustion engine based on the operation conditions of said internal combustion engine and the result of judgement by said knock judging means;

wherein provision is further made of:
a transience judging means for judging said operation conditions that are in a transient state; and
an average value correction means for decreasing said average knocking level depending upon a transience judgement signal from said transience judging means.

In the device for controlling the knocking of an internal combustion engine according to the present invention, provision is made of a correction inhibition means for selectively inhibiting the decrement correction processing by said average value correction means, wherein said correction inhibition means inhibits the decrement correction processing that is based on said transience judgement signal until a predetermined period of time has passed after the start of the decrement correction processing for said average knocking level by said average value correction means.

In the device for controlling the knocking of an internal combustion engine according to the present invention, said predetermined period of time is set to correspond to a period of time until said average knocking level returns to a steady value after the start of the decrement correction processing for said average knocking level.

In the device for controlling the knocking of an internal combustion engine according to the present invention, said average value correction means sets a minimum value of said average knocking level to 0 immediately after the start of the decrement correction processing.

In the device for controlling the knocking of an internal combustion engine according to the present invention, said average value correction means variably sets the decrement correction quantity for said average knocking level depending upon the operation conditions of said internal combustion engine.

In the device for controlling the knocking of an internal combustion engine according to the present invention, said transience judging means forms said transience judgement signal when a rate of change in a load parameter of said internal combustion engine exceeds a predetermined value.

In the device for controlling the knocking of an internal combustion engine according to the present invention, said averaging means includes a second averaging means that sets a reflection factor of said signals of the knocking level to a large value on a side where said average knocking level increases, and said average value correction means decreases a second average knocking level operated by said second averaging means.

DESCRIPTION OF THE PREFERRED EMBODIMENTS

Embodiment 1

An embodiment 1 of the present invention will now be described with reference to the drawings.

Figure 1:
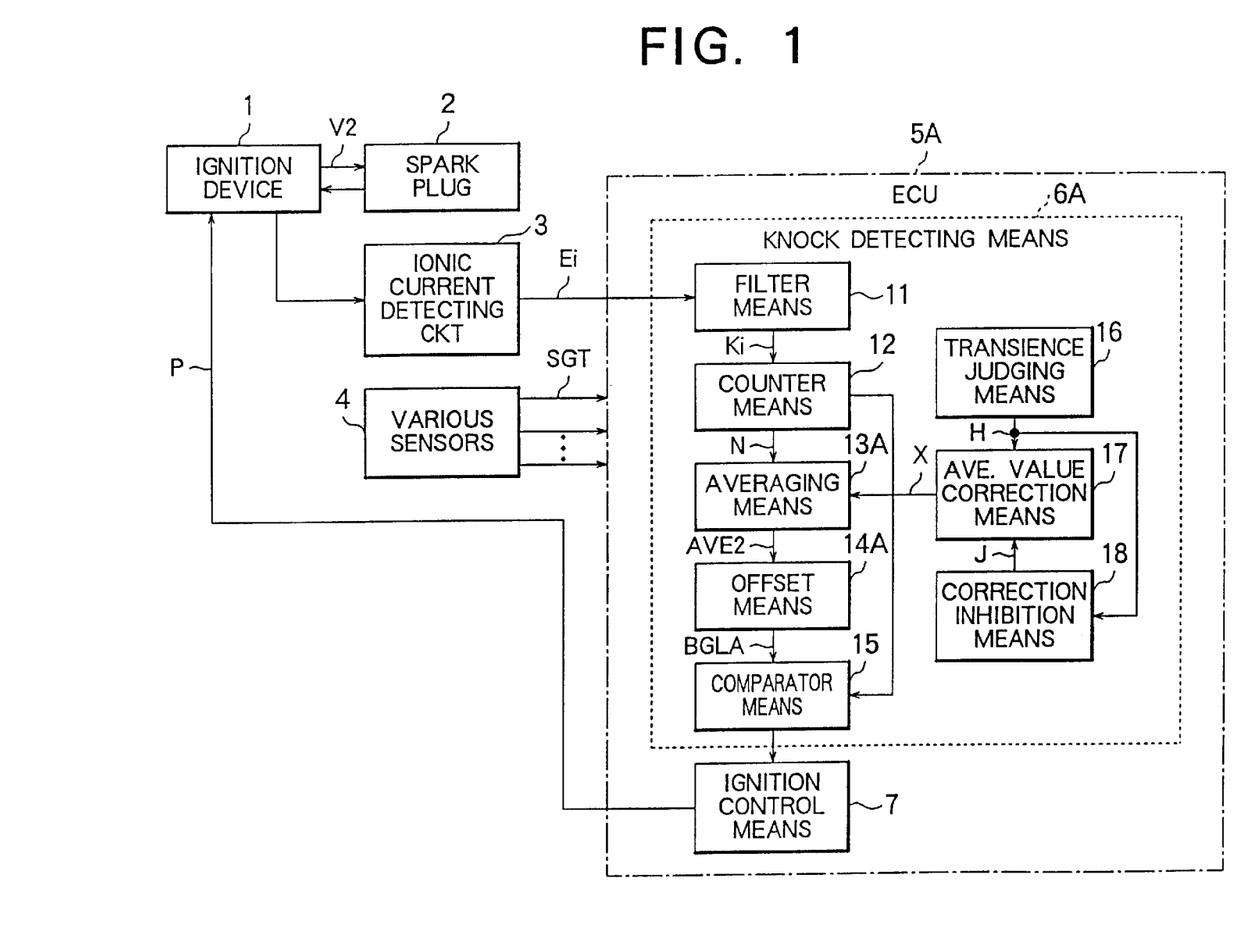
FIG. 1 is a block diagram illustrating an embodiment 1 of the present invention.

FIG. 1 is a block diagram schematically illustrating the embodiment 1 of the present invention, wherein the same portions as those described above (see FIG. 5) are denoted by the same reference numerals but are not described here again in detail.

In FIG. 1, the knock detecting means 6A in the ECU 5A further includes a transience judging means 16, an average value correction means 17 and a correction inhibition means 18 in addition to the filter means 11 through up to the comparator means 15.

In this case, the averaging means 13A includes a second averaging means (not shown) that sets the reflection factor of the number N of the pulses (signals of the knocking level) to a large value on the side where the average knocking level AVE increases, and forms a second average knocking level AVE2 operated by the second averaging means.

Therefore, the offset means 14A adds the offset value OFS to the second average knocking level AVE2 to form a background level BGLA, and the comparator means 15 compares the number N of the pulses with the background level BGLA.

The transience judging means 16 judges the operation conditions of the engine that are in a transient state based on the load parameter (e.g., throttle opening degree, intake air pressure, etc.) included in the data detected by various sensors 4, and forms a transience judgment signal H when a rate of change in the load parameter exceeds a predetermined value that represents the transient state.

The average value correction means 17 selectively sets an average value correction coefficient X for decreasing the average knocking level AVE2 depending on the transience judgement signal H.

Therefore, the averaging means 13A decreases the average knocking level AVE2, and the offset means 14A corrects the background level BGLA to an optimum value.

The correction inhibition means 18 forms a correction inhibition signal J until a predetermined period of time has passed after the start of the decrement correction processing for the average knocking level AVE2 by the average value correction means 17, so that the decrement correction processing will not be effected again irrespective of the input of the transience judgement signal H.

The predetermined period of time in the correction inhibition means 18 is set to be corresponded to the period of time of from when the decrement correction processing for the average knocking level AVE2 is started by the average value correction means 17 until when the average knocking level AVE2 returns to a steady value.

Next, the operation of the embodiment 1 of the invention shown in FIG. 1 will be described with reference to a flow chart of FIG. 2.

Figure 2:
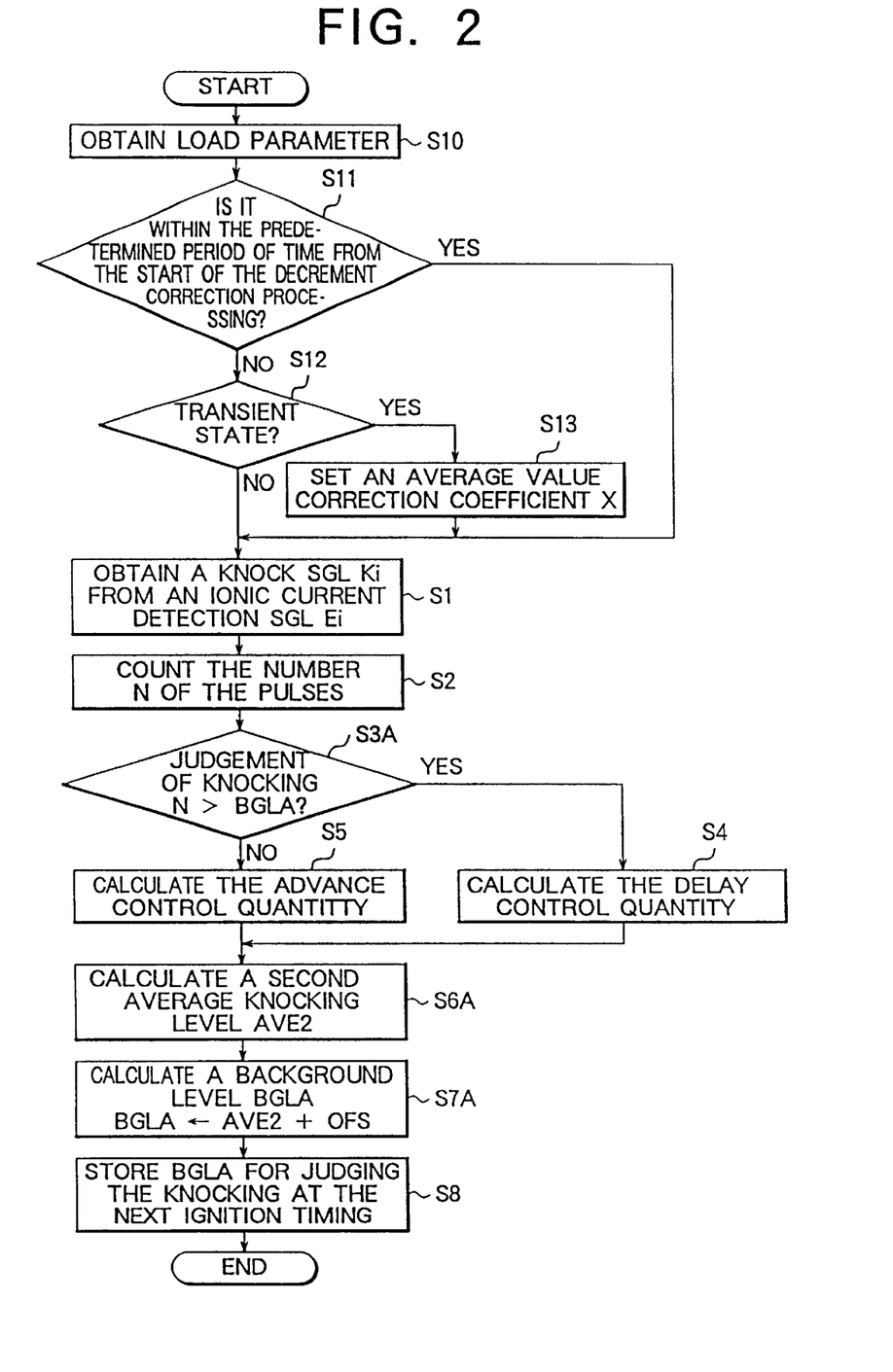
FIG. 2 is a flow chart illustrating the operation for correcting an average value according to the embodiment 1 of the present invention.

In FIG. 2, the steps S1 to S8 same as those mentioned above (see FIG. 7) are denoted by the same reference numerals but are not described here again in detail. The steps S3A, S6A and S7A are corresponding to the above-mentioned steps S3, S6 and S7.

First, the transience judging means 16 in the knock detecting means obtains a load parameter (throttle opening degree, etc.) included in the operation data input to the ECU 5A (step S10).

Then, the correction inhibition means 18 judges whether it is within the predetermined period of time (for inhibiting the correction processing) from the start of the decrement correction processing (step S11). When it is judged that it is within the predetermined period of time from the start of the decrement correction processing (i.e., YES), the correction inhibition means 18 forms a correction inhibition signal J, and the routine readily proceeds to a normal processing step S1.

Thus, an excess of decrement correction processing caused by the continuous correction is inhibited within the predetermined period of time from the start of the decrement correction processing for the average knocking level AVE2 by the average value correction means 17.

On the other hand, when it is judged at step S11 that the predetermined period of time has not yet passed from the start of the decrement correction processing (i.e., NO), the correction inhibition means 18 does not form the correction inhibition signal J and validates the judgement of the transience judging means 16.

That is, based on a rate of change in the load parameter, the transience judging means 16 judges whether the present operation conditions are in a transient (accelerating or decelerating) state (step S12). When it is judged that the present operation conditions are in a transient state (i.e., YES), the transience judging means 16 forms a transience judgment signal H.

Therefore, the average value correction means 17 sets an average value correction coefficient X in response to the transience judgement signal H (step S13), and the routine proceeds to the normal processing step S1.

On the other hand, when it is judged at step S12 that the operation conditions are not in a transient state (i.e., NO), the processing is not executed at step S13 and the routine readily proceeds to step S1.

Hereinafter, the knock detecting means 6A obtains a knock signal Ki from an ionic current detection signal Ei (step S1), counts the number N of the pulses of a knocking frequency (step S2), and calculates the ignition timing control quantity (step S4 or SS) based on the judgement of knocking (step S3A).

Then, the averaging means 13A in the knock detecting means 6A calculates a second average knocking level AVE2 that is decreased by using an average value correction coefficient X according to the following formula (4)(step 56A), $$AVE2 = AVE2(n-1) + \{NP - AVE2(n-1)\} \times KF2 - X \quad (4)$$

wherein AVE2(n−1) is the second average knocking level AVE2 of the previous time, and KF2 is the second averaging coefficient (KF2>1).

The second averaging coefficient KF2 is variably set depending on the number N of the pulses, and is set to a large value as the number N of the pulses becomes larger than the second average knocking level AVE2(n−1) of the previous time.

According to the averaging processing of the formula (4), therefore, the second average knocking level AVE2 changes more quickly toward the side where the noise level increases and is, hence, set to a value close to a peak noise.

The offset means 14A calculates the background level BGLA (step S7A) by using the second average knocking level AVE2 calculated at step 56A according to the following formula (5), $$BGLA = AVE2 + OFS \quad (5)$$

Finally, the background level BGLA calculated from the formula (5) is stored as a value for judging the knocking next time at step S3A (step S8), and the processing routine of FIG. 2 ends.

Figure 3:
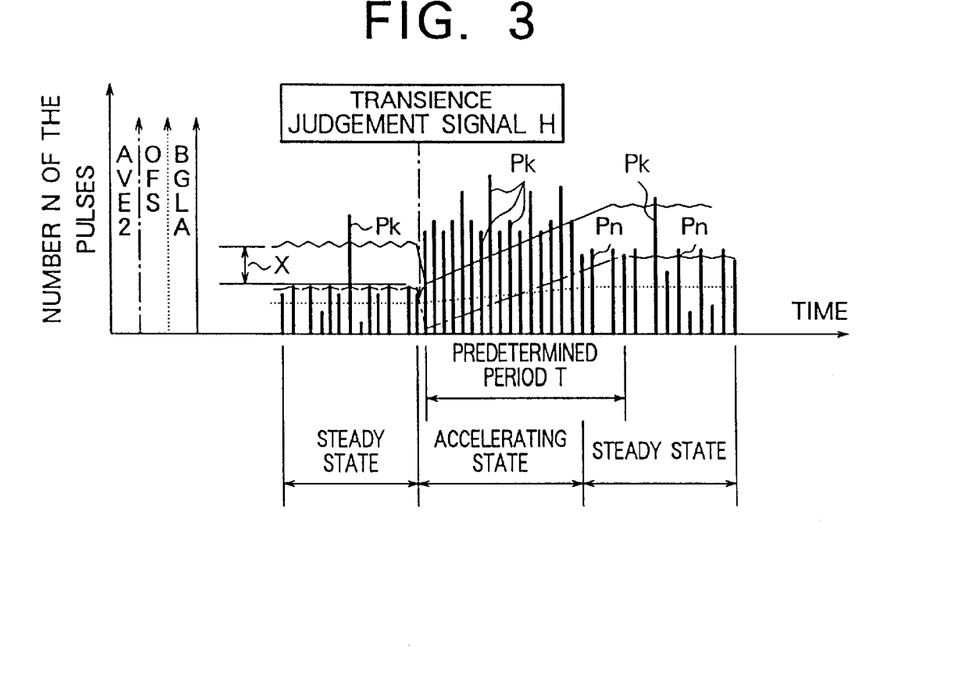
FIG. 3 is a diagram illustrating the operation for detecting the knocking in the accelerating state according to the embodiment 1 of the present invention.
Figure 4:
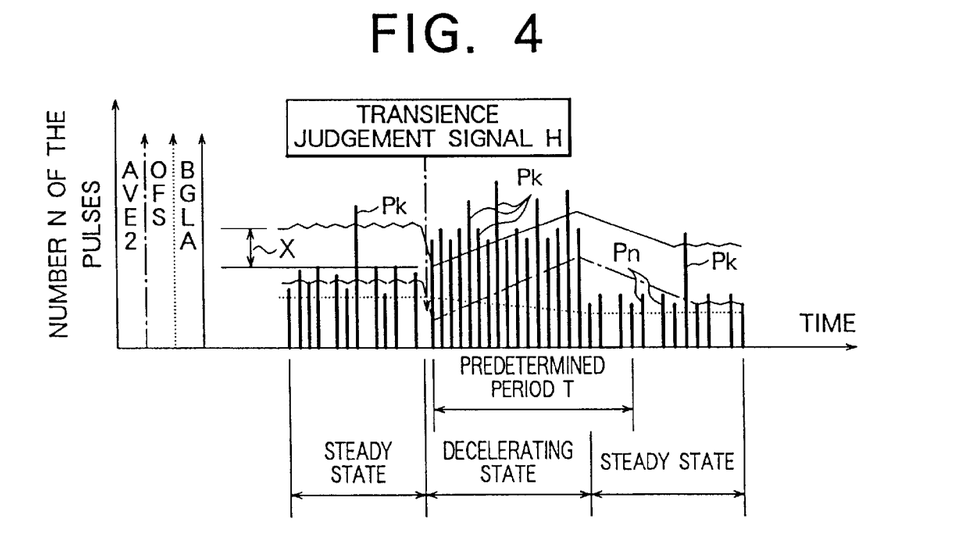
FIG. 4 is a diagram illustrating the operation for detecting the knocking in the decelerating state according to the embodiment 1 of the present invention.

Next, described below with reference to FIGS. 3 and 4 is the operation for detecting the knocking in a transient state according to the embodiment 1 of the present invention.

FIGS. 3 and 4 are corresponding to FIGS. 8 and 9 described earlier, and wherein the same portions as those described earlier are denoted by the same reference numerals but are not described here again in detail.

Here, the solid curves represent changes in the second average knocking level AVE2 with the passage of time, dotted curves represent changes in the offset value OFS with the passage of time, and dot-dash chain curves represent changes in the background level BGLA (=AVE2+OFS) after corrected with the passage of time.

In FIGS. 3 and 4, the average knocking level AVE2 (solid line) in a transient state decreases in response to the transience judgement signal H and, at the same time, the background level BGLA (dot-dash chain line) decreases.

When the pulses of the knocking level are generated in an increased number Pk in the accelerating state as shown in FIG. 3, the second average knocking level AVE2 tends to sharply increase, which, however, is decreased by the average value correction coefficient X in response to the transience judgement signal H in compliance with the formula (4). Therefore, the background level BGLA (dot-dash chain line) for judging the knocking is suppressed from sharply increasing.

Therefore, when the background level BGLA is normalized and the pulses corresponding to the knocking level are detected in a number Pk, the knocking is normally judged relying on N>BGLA, preventing erroneous judgement due to noise. When the pulses corresponding to the noise level are detected in a number Pn, further, the noise is normally judged relying on N≦BGLA.

After the average value correction means 17 has once executed the decrement correction processing in response to the transience judgement signal H, the decrement correction processing is not executed despite the transience judgement signal H is formed next time until a predetermined period of time T (predetermined number of times of ignition) passes which is long enough for the background level BGLA to return to the steady value. Therefore, excess of decrement correction processing is prevented.

When the engine is shifted to the decelerating state, too, as shown in FIG. 4, the second average knocking level AVE2 sharply increases due to the frequent occurrence of knocking. Therefore, the background level BGLA tends to sharply increase despite of a decrease in the offset value OFS.

In response to the transience judgement signal H, however, the average value correction means 17 works to decrease the second average knocking level AVE2. Accordingly, the background level BGLA (dot-dash line) is normalized by being suppressed from increasing, and the knocking and the noise are properly judged.

In this decelerating (transient) state, too, therefore, the decrement correction processing is not effected despite the transience judgement signal H is formed next time within the predetermined period of time T after the start of the decrement correction processing by the average value correction means 17.

Even right after the engine is shifted from the decelerating state to the steady state, the increment of the second average knocking level AVE2 is suppressed during the deceleration (during the transient state), and the number Pk of the pulses of the knocking level exceeds the background level BGLA making it possible to normally judge the knocking.

Upon decreasing the second average knocking level AVE2 depending on the transience judgment signal H in the transient state, the background level BGLA that serves as a reference for judging the noise level can be changed into an optimum value.

Despite the knocking frequently occurs in the transient state, therefore, the knocking can be detected maintaining reliability based upon the proper judgement of knocking.

Further, the correction inhibition means 18 inhibits the decrement correction processing from being executed again until the predetermined period of time T passes from the start of the decrement correction processing, making it possible to prevent the second average knocking level AVE2 from excessively decreasing.

That is, at the time of judging the transience, the second average knocking level AVE2 is once corrected to decrease but gradually increases again following the level of the number N of the pulses detected at every operation timing (ignition control) and, hence, returns to a steady value within the predetermined period of time T.

Here, the predetermined period of time T was set depending on the number of times of ignition. However, the time that varies depending on the rotational speed of the engine may be set as a map value.

Further, the pulses of the knock signals Ki of the number N were used as the signals of the knocking level.

As is well known, however, any parameter such as a peak value or an integrated value of the knock signals Ki may be used, as a matter of course.

Further, the transient state was judged relying on a rate of change in the throttle opening degree. However, the transient state may be judged based on a rate of change in other load parameter (e.g., amount of the air taken in by the engine or negative pressure in the intake pipe) obtained from various sensors 4.

The decrement correction processing was effected by subtracting the average correction coefficient X (e.g., a value within a range of $0 \leq X \leq 4$) from the second average knocking level AVE2. It is, however, also allowable to set an average value correction coefficient X within a range of $0 \leq X < 1$) in the average value correction means 17, and multiply it upon the second average knocking level AVE2 to effect the decrement correction processing.

In order to improve response of the average knocking level in a direction in which the noise level increases, further, use was made of the averaging means 13A for operating the second average knocking level AVE2. However, there may be used an averaging means (see FIG. 5) for operating a general average knocking level AVE.

Embodiment 2

Though the above-mentioned embodiment 1 did not refer to the conditions of the average value correction coefficient X set by the average value correction means 17 in the transient state, the average value correction coefficient X may be so set that a minimum value of the second average knocking level AVE2 becomes "0" immediately after the start of the decrement correction processing.

In this case, the background level BGLA decreases to a value that is in agreement with the offset value OFS immediately after the engine is shifted from a steady state to a transient state, and the background level BGLA is reliably and quickly suppressed from sharply increasing.

Further, since a minimum required offset value OFS is maintained as the background level BGLA, it is made possible to prevent such an occurrence that the noise component is erroneously judged as the knocking component.

Embodiment 3

The average value correction coefficient X may be variably set depending on the operation conditions that are in a transient state.

In this case, for example, when the engine rotational speed is in a low speed region, the second average knocking level AVE2 is decreased by a small amount to suppress unnecessary decrement correction.

What is claimed is:

1. A device for controlling the knocking of an internal combustion engine comprising:
   various sensors for detecting the operation conditions of an internal combustion engine;
   an ionic current detecting means for detecting the ionic current that flows through a spark plug during the combustion in said internal combustion engine;
   a knocking level operation means for processing the signals of the knocking level corresponding to the knocking state of said internal combustion engine based on said ionic current;
   an averaging means for determining an average knocking level by averaging said signals of the knocking level;
   a background level operation means for establishing a background level based on said average knocking level;
   a knock judging means for judging the knocking state of said internal combustion engine by comparing said signals of the knocking level with said background level; and
   a control quantity calculation means for calculating the control quantity of said internal combustion engine based on the operation conditions of said internal combustion engine and the result of judgement by said knock judging means;
   wherein provision is further made of:
   a transience judging means for judging said operation conditions that are in a transient state; and
   an average value correction means for decreasing said average knocking level depending upon a transience judgement signal from said transience judging means.

2. A device for controlling the knocking of an internal combustion engine according to claim 1, wherein provision is made of a correction inhibition means for selectively inhibiting the decrement correction processing by said average value correction means, and said correction inhibition means inhibits the decrement correction processing that is based on said transience judgement signal until a predetermined period of time has passed after the start of the decrement correction processing for said average knocking level by said average value correction means.

3. A device for controlling the knocking of an internal combustion engine according to claim 2, wherein said predetermined period of time is set to correspond to a period of time until said average knocking level returns to a steady value after the start of the decrement correction processing for said average knocking level.

4. A device for controlling the knocking of an internal combustion engine according to claim 1, wherein said average value correction means sets a minimum value of said average knocking level to 0 immediately after the start of the decrement correction processing.

5. A device for controlling the knocking of an internal combustion engine according to claim 1, wherein said average value correction means variably sets the decrement correction quantity for said average knocking level depending upon the operation conditions of said internal combustion engine.

6. A device for controlling the knocking of an internal combustion engine according to claim 1, wherein said transience judging means forms said transience judgement signal when a rate of change in a load parameter of said internal combustion engine exceeds a predetermined value.

7. A device for controlling the knocking of an internal combustion engine according to claim 1, wherein said averaging means includes a second averaging means that sets a reflection factor of said signals of the knocking level to a large value on a side where said average knocking level increases, and said average value correction means decreases a second average knocking level operated by said second averaging means.

\* \* \* \* \*